United States Patent
Sugiyama et al.

(10) Patent No.: US 7,405,175 B2
(45) Date of Patent: Jul. 29, 2008

(54) CATALYST AND METHOD FOR CLARIFYING EXHAUST GAS

(75) Inventors: Masashi Sugiyama, Chiba (JP); Kengo Soda, Chiba (JP)

(73) Assignee: Sumitomo Metal Mining Co., Ltd., Tokyo (JP)

(*) Notice: Subject to any disclaimer, the term of this patent is extended or adjusted under 35 U.S.C. 154(b) by 0 days.

(21) Appl. No.: 10/518,005

(22) PCT Filed: Jun. 3, 2003

(86) PCT No.: PCT/JP03/07017

§ 371 (c)(1),
(2), (4) Date: Dec. 14, 2004

(87) PCT Pub. No.: WO03/106026

PCT Pub. Date: Dec. 24, 2003

(65) Prior Publication Data

US 2005/0207957 A1    Sep. 22, 2005

(30) Foreign Application Priority Data

Jun. 17, 2002 (JP) ............................ 2002-175187
Nov. 26, 2002 (JP) ............................ 2002-341623

(51) Int. Cl.
*B01J 29/06* (2006.01)
*B01D 53/56* (2006.01)

(52) U.S. Cl. ..................... 502/64; 423/239.2

(58) Field of Classification Search .............. 423/239.2; 502/64

See application file for complete search history.

(56) References Cited

U.S. PATENT DOCUMENTS

| | | | |
|---|---|---|---|
| 3,308,069 A | * | 3/1967 | Rosinski et al. ............... 502/62 |
| 5,041,272 A | | 8/1991 | Tamura et al. |
| 5,279,997 A | | 1/1994 | Montreuil et al. |
| 5,336,476 A | * | 8/1994 | Kintaichi et al. .......... 423/239.1 |
| 5,374,410 A | * | 12/1994 | Grasselli et al. .......... 423/239.2 |
| 5,407,880 A | * | 4/1995 | Ikeda et al. ..................... 502/67 |
| 5,776,423 A | * | 7/1998 | Feeley et al. .............. 423/239.2 |
| 6,171,556 B1 | * | 1/2001 | Burk et al. .................... 422/173 |
| 6,528,031 B1 | * | 3/2003 | Park et al. ................. 423/239.2 |

FOREIGN PATENT DOCUMENTS

| | | |
|---|---|---|
| CA | 2013869 | 7/1999 |
| DE | 40 16 688 | 6/1991 |
| EP | 0945166 | 9/1999 |
| FR | 2 655 565 | 6/1991 |
| GB | 2 238 784 | 6/1991 |
| JP | 02-139645 | 5/1990 |
| JP | 3-181321 | 8/1991 |
| JP | 04-267946 | 9/1992 |
| JP | 04-354536 | 12/1992 |
| JP | 05-068855 | 3/1993 |
| JP | 05-103949 | 4/1993 |
| JP | 06-047255 | 2/1994 |
| JP | 08-038906 | 2/1996 |
| JP | 09-038502 | 2/1997 |
| JP | 2000-308831 | * 11/2000 |

OTHER PUBLICATIONS

Shokubai (Catalyst), vol. 33 (1991), No. 5, pp. 320-327, The Catalysis Society of Japan, no month.

* cited by examiner

*Primary Examiner*—Elizabeth D. Wood
(74) *Attorney, Agent, or Firm*—Smith, Gambrell & Russell, LLP

(57) ABSTRACT

A proton type β zeolite is used as catalyst. Nitrogen oxides in the exhaust gas containing excessive oxygen is reduced/removed by making the exhaust gas contact with the catalyst under the existence of methanol and/or dimethyl ether as reducing agent. It is desirable that a $SiO_2/Al_2O_3$ molar ratio of the proton type β zeolite is within 20-70. Thereby, the present catalyst has an excellent denitration performance and durability even against the exhaust gas containing sulfur oxides, and the denitration performance does not deteriorate even when the exhaust gas is at comparatively low temperature of 300-400° C.

3 Claims, No Drawings

CATALYST AND METHOD FOR CLARIFYING EXHAUST GAS

TECHNICAL FIELD

The present invention relates to an catalyst for purifying exhaust gas effective for removing nitrogen oxides (NOx) contained in various types of combustion exhaust gas from boilers, diesel engine motors or diesel engine motor vehicles and from industrial facilities and a method for purifying the exhaust gas using the catalyst.

BACKGROUND ART

Nitrogen oxides (NOx) such as nitrogen monoxide and nitrogen dioxide are contained in various types of exhaust gas from factories, electric power facilities, other industrial facilities and motor vehicles. This NOx not only affects especially on the respiratory system of human body but also causes acid rain seen as a problem in global environment conservation. Therefore, a technical development effective for removing nitrogen oxides in various types of exhaust gas is desired.

Among methods for removing such nitrogen oxides known so far, there are a ternary catalytic method being used in exhaust gas treatment of a motor vehicle (a gasoline-powered vehicle) and a selective catalytic reduction method using ammonia as reducing agent. But the ternary catalytic method cannot apply to the exhaust gas containing oxygen in excess of theoretical amount necessary to completely oxidize an unburned hydrocarbon or carbon monoxide remaining in the exhaust gas.

Meanwhile, among methods for reducing/removing NOx from the exhaust gas containing excess oxygen known so far, there is a selective catalytic reduction method using a catalyst comprising $V_2O_5$—$TiO_2$ and using ammonia as reducing agent. In this way, however, it is not easy to care for because of using highly smelling and harmful ammonia, and facilities grow in size because it needs a special apparatus for limiting emissions of unreacted ammonia. Therefore, it is not adequate to apply to a small-sized exhaust gas source or mobile source, and undesirable in economical efficiency.

In recent years, it has been reported that using an unburned hydrocarbon as a reducing agent remaining in the lean-burned combustion exhaust gas containing excess oxygen (ex. diesel engine) can accelerate a reduction reaction of NOx in the exhaust gas. Since this report, various catalysts to accelerate the reduction reaction of NOx have been developed, and many reports have been made, for example, alumina and transition metal-impregnated almina are effective for a reduction/removal reaction of NOx which uses hydrocarbons as reducing agent.

As an example of a catalyst which reduces/removes nitrogen oxides in the combustion exhaust gas containing excess oxygen with using such hydrocarbons as reducing agent, besides alumina and transition metal-impregnated alumina, a reduction catalyst which comprises alumina or silica-alumina including 0.1-4 weight % Cu, Fe, Cr, Zn, Ni or V of 0.1-4 has been reported (Refer to JP KOKAI Hei 04-284848).

Furthermore, it has been reported that the reduction reaction of NOx proceeds even in a low-temperature range of 200-300° C. when alumina impregnated with Pt and the like. (Refer to JP KOKAI Hei 04-267946, JP KOKAI Hei 05-68855 and JP KOKAI Hei 05-103949). However, the catalyst using such precious metals has defect that it is difficult to get selectively proceed a reduction reaction into harmless $N_2$ because a combustion reaction of hydrocarbon which is a reducing agent is promoted excessively or because $N_2O$ which is seen as one of causative agent of global warming is side-produced in large quantity.

Furthermore, it is reported that alumina and the like impregnated with silver, with using hydrocarbon as reducing agent in the exhaust gas containing excess oxygen, makes NOx reductive reaction proceed selectively (Refer to JP KOKAI Hei 04-281844). After this report, lots of similar methods for NOx reduction/removal using the catalyst containing silver have been developed and reported (Refer to JP KOKAI Hei 04-354536).

However, each method for purifying the exhaust gas using NOx removal catalyst has a problem that, in the exhaust gas containing sulfur oxides and excess oxygen, the NOx removal performance deteriorates remarkably and the practicable durability is insufficient. Furthermore, it has also a problem that NOx removal performance is low if the majority of the exhaust gas is at relatively low temperature of 300-400° C.

Furthermore, the method for the NOx reduction/removal under coexistence of organic compounds which uses a hydrogenated zeolite catalyst or zeolite catalysts impregnated with V, Cr, Mn, Fe, Co, Ni and the like has been reported and, as the zeolite, Y-type zeolite, L-type zeolite, offretite-erionite mixed crystal-type-zeolite, ferrierite-type zeolite and ZSM-5-type zeolite are shown (Refer to JP Patent No. 2139645). Furthermore, the method for the NOx reduction/removal in the presence of methanol which uses a proton-type zeolite has also been reported and, as the zeolite, Y-type zeolite, ZMS-5-type-zeolite and mordenite are shown (Refer to JP Patent No. 2506598).

However, each method for the NOx reduction/removal which uses above-mentioned specific zeolite catalysts can not obtain the practicably satisfying NOx removal performance, and at present, has not been put into practical use.

An object of this invention is, in consideration of such circumstances, to provide a catalyst for purifying exhaust gas, having an excellent NOx removal performance and durability even against the exhaust gas containing sulfur oxides, and having a high denitration performance and an excellent practicality even when the exhaust gas is at relatively low temperature of 300-400° C., and to provide a method of purifying exhaust gas using the catlyst.

DISCLOSURE OF THE INVENTION

To achieve the above object, the catalyst for purifying exhaust gas according to the present invention is able to reduce and remove nitrogen oxides in the exhaust gas in which excessive oxygen exsists, under the existence of methanol and/or dimethyl ether, is characterized in that it consists of a proton type β zeolite.

Furthermore, the method for purifying the exhaust gas according to the present invention, in order to reduce and remove nitrogen oxides in the exhaust gas, comprises a step of making the exhaust gas in which excessive oxygen exists contact with the proton type β zeolite catalyst under the existence of methanol and/or dimethyl ether which is a reducing agent.

In the exhaust gas purifying catalyst and the method for purifying the exhaust gas according to the present invention, it is desirable that a $SiO_2/Al_2O_3$ molar ratio of the proton type β zeolite is within 20-70.

The present invention can provide a catalyst for purifying exhaust gas having an excellent NOx removal performance and durability, and by using the catalyst, it is possible to effectively remove NOx in the exhaust gas in which excessive oxygen exists. Besides, the exhaust gas purifying catalyst according to the present invention shows a high NOx removal efficiency even against the exhaust gas containing a large amount of sulfur oxides, and it is quite excellent in practice because the denitration performance does not deteriorate even when the exhaust gas is at relatively low temperature of 300-400° C.

BEST MODE FOR CARRYING OUT THE INVENTION

The present invention, at the denitration of nitrogen oxides (NOx) in the exhaust gas in which excessive oxygen exists, uses a proton type β zeolite as a catalyst. As the zeolite, besides type β, there are many types such as type Y, L, ZSM-5 (FMI), mordenite and the like, and among them, it is cleared that the proton type β zeolite which is a hydrogenated β zeolite is especially quite effective for purifying the exhaust gas containing sulfur oxides. That is, by using proton type β zeolite, the nitrogen oxides in the exhaust gas containing sulfur oxides can be reduced and removed under the existence of methanol and/or dimethyl ether.

The proton type β zeolite is made, for example, by treating β zeolite with aqueous ammonium nitrate solution and the like so as to be ammonium type, and thereafter burning it to make ammonia emitted. In addition, the proton type β zeolite can be molded and can be formed as various shape catalysts in accordance with usage.

It is desirable that a silica ($SiO_2$)-alumina ($Al_2O_3$) ratio of the proton type β zeolite is, in terms of the denitration performance which removes NOx, within 20-70 in molar ratio. Above 40 of the molar ratio, the denitration performance tends to deteriorate, and, considering stability against heat and vapor, it is more desirable that a $SiO_2$—$Al_2O_3$ molar ratio is within 20-40.

The proton type β zeolite catalyst can be molded in various shapes such as spherical, honeycomb, pellet state and the like by conventional molding methods. These shapes and sizes may be selected arbitrarily according to use conditions of catalyst. Furthermore, a catalyst can be made by means of wash-coating or otherwise proton type β zeolite on the surface of a support plate having fireproof construction with some through-holes in the flow direction of the exhaust gas.

As the method for purifying the exhaust gas containing nitrogen oxides in which excessive oxygen exists, the exhaust gas may be contacted with the above-mentioned proton type β zeolite catalyst of the present invention under the existence of methanol and/or dimethyl ether. The amount of methanol and/or dimethyl ether coexisting in the exhaust gas as reducing agent may be selected arbitrarily according to the NOx removal efficiency or running cost which are operationally required, but typically, it is desirable that the molar ratio (in carbon (C)) of the exhaust gas to nitrogen oxides is 0.5-5 degree.

As exhaust gases containing nitrogen oxides to which the present invention is applied, there are gases exhausted from various combustion facilities such as boiler or the like, internal combustion engines of diesel engine motor vehicles or stationary diesel engines or the like, and industrial facilities such as nitric acid production facility. These exhaust gases generally contain reducing component such as CO, HC (Hydrocarbon) and $H_2$, and oxidizing component such as NOx and $O_2$, but contain oxygen amount in excess of stoichiometric amount necessary for complete oxygen reduction reaction of the oxidizing component. NOx in the exhaust gas in which excessive oxygen exists is reduced and decomposited into $N_2$ and $H_2O$, by making the exhaust gas contact with the catalyst of the present invention under the existence of methanol and/or dimethyl ether.

It is desirable that a gas space velocity (SV) in the method for purifying the exhaust gas using the catalyst according to the present invention is, not to be considered limited to, 1,000-100,000 $mh^{-1}$. Furthermore, even when the exhaust gas is at relatively low temperature of 300-400° C., an excellent denitration performance can be obtained substantially equivalent to the case at high temperature. Besides, the catalyst of the present invention has an excellent denitration performance even against the exhaust gas containing sulfur oxides and is also excellent in its durability.

Meanwhile, when the exhaust gas is treated by the method according to the present invention, depending on reaction condition, unburned methanol or dimethyl ether and poor combustion product are exhausted in the gas. In such a case, the methanol or dimethyl ether and poor combustion product can be removed by making the exhaust gas contact with an oxidation catalyst which is for example supported by precious metals such as Pt or Pd.

Embodiment

A proton type β zeolite was obtained by burning $NH_4$ type β zeolite ($SiO_2/Al_2O_3$ molar ratio: 27) on the market at 450° C. for 5 hours. This zeolite was pressure-formed, grained to the particle size of 350-500 μm, and defined as Catalyst 1 of the present invention. Furthermore, another proton type β zeolite was obtained by above-mentioned method except for using $NH_4$ type β zeolite ($SiO_2/Al_2O_3$ molar ratio: 37) on the market. This zeolite was defined herein as Catalyst 2 of the present invention.

Correspondingly, as comparative example, the under-mentioned Catalysts C1-C4 were prepared. That is, Catalyst Cl is a proton type β zeolite which is obtained by burning a commercially available $NH_4$ type β zeolite ($SiO_2/Al_2O_3$ molar ratio: 75) at 450° C. for 5 hours. Catalyst C2 is a proton type mordenite which is obtained by burning a commercially available $NH_4$ type mordenite ($SiO_2/Al_2O_3$ molar ratio: 20) at 450° C. for 5 hours. Catalyst C3 is a proton type ZSM-5 which is obtained by burning $NH_4$ type ZSM-5 ($SiO_2/Al_2O_3$ molar ratio: 27) on the market at 450° C. for 5 hours. Furthermore, Catalyst C4 is made of β zeolite carrying Co which is obtained by mixing 100 g of ion-exchanged water with 1.3 g of cobalt acetate tetrahydrate, dispersing 10 g of proton type β zeolite ($SiO_2/Al_2O_3$ molar ratio: 27) obtained by the above-mentioned method of Catalyst 1 into the solution, agitating at 60° C. for 12 hours, and then, after filtering, wet-cleaning and drying at 110° C., burning at 500° C. for 3 hours in the atmosphere. In addition, the amount of Co in the Catalyst C4 was 2.7 weight % in metal to the whole catalyst.

Catalyst 1, 2 and comparative examples of Catalyst C1-C4 obtained by the above-mentioned methods were filled into each reaction tube of steel measuring 15 mm in inner diameter so as to form catalyst body, and these were fixed on the atmospheric fixed bed flow reactor. Within each reaction tube, as exhaust gas model, a mixed gas consisting of NO: 1,000 ppm, $O_2$: 10%, methanol: 1,000 ppm, $H_2O$: 10%, $SO_2$: 100 ppm, and remnant: $N_2$ was supplied under the condition that the spacial velocity is 30,000 $h^{-1}$, and the NOx removal performance of each catalyst was evaluated. At that time, gas temperature was changed to at 300, 350 and 400° C., respectively.

Furthermore, the denitration performance of each catalyst was evaluated in the same way by changing gas composition of the model exhaust gas. That is, the denitration performance was evaluated by changing methanol: 1,500 ppm which was added in the above-mentioned exhaust gas model as reducing agent to dimethyl ether: 750 ppm, and by using Catalyst 1, C2 and C3. Furthermore, the denitration performance was evaluated by changing the reducing agent to propylene: 500 ppm and 1,000 ppm and using Catalyst 1.

Meanwhile, as for the gas composition analysis of the reaction tube exit, the NOx concentration was measured by a chemiluminescent nitrogen oxide analyzer, and the $N_2O$ concentration was measured by a gas matograph having a thermal conductivity detector Porapak Q column. In any catalyst, $N_2O$ was hardly detected at the gas reaction tube exit. The NOx removal efficiency as NOx removal performance of catalyst was calculated according to the following formula;

NOx removal efficiency (%)=

[(NOx concentration at reaction tube entry−NOx concentration at reaction tube exit)/(Nox concentration at reaction tube entry)]×100

The NOx removal efficiencies of the above-mentioned Catalyst 1, 2 and C1-C4 are shown in the following table 1. As is clear from the result, it is understandable that, Catalysts 1 and 2 according to the present invention, compared to comparison example Catalysts C1-C4, have remarkably excellent NOx removal performance in the exhaust gas containing excessive oxygen in which a large amount of sulfur oxides exists, even at relatively low temperature of 300-400° C. Furthermore, it is understandable that in Catalyst 1 and 2 according to the invention, by using methanol and/or dimethyl ether as reducing agent, an excellent denitration performance is appeared. Meanwhile, it is understandable that Catalyst C1 which is a proton type β zeolite but $SiO_2/Al_2O_3$ molar ratio is 75 has an extremely small NOx removal efficiency.

TABLE 1

| Sample | Catalyst | Reducing agent | NOx removal efficiency (%) | | |
|---|---|---|---|---|---|
| | | | 300.° C. | 350.° C. | 400.° C. |
| 1 | Catalyst 1 | Methanol | 64 | 88 | 95 |
| 2 | Catalyst 2 | Methanol | 59 | 81 | 90 |
| 3 | Catalyst 1 | Dimethyl Ether | 64 | 84 | 93 |
| 4* | Catalyst C1 | Methanol | 18 | 27 | 35 |
| 5* | Catalyst C2 | Methanol | 22 | 46 | 56 |
| 6* | Catalyst C3 | Methanol | 17 | 32 | 51 |
| 7* | Catalyst C4 | Methanol | 42 | 66 | 67 |
| 8* | Catalyst C2 | Dimetyl Ether | 24 | 44 | 58 |
| 9* | Catalyst C3 | Dimetyl Ether | 15 | 35 | 52 |
| 10* | Catalyst 1 | Propylene (500 ppm) | 27 | 40 | 61 |
| 11* | Catalyst 1 | Propylene (1,000 ppm) | 29 | 45 | 67 |

(NOTICE) samples * on this table are comparative examples.

Next, the durability evaluation of Catalyst, by using the above-mentioned Catalyst 1 according to the present invention and comparative examples Catalyst $C_2$-$C_4$, is described below. That is, as exhaust gas model, a mixed gas consisting of NO: 1,000 ppm, $O_2$: 10%, methanol: 1,500 ppm or dimethyl ether: 750 ppm, $H_2O$: 10%, $SO_2$: 1,000 ppm and remnant: $N_2$ was supplied into each reaction tube which is arranged in a similar way as described above under the condition that the gas temperature is 350° C. and the space velocity is 30,000 h$^{-1}$ for 20 hours.

After the above-mentioned durability test, the exhaust gas model which is similar in composition to the above model except for containing 100 ppm of $SO_2$ was supplied into each reaction tube under the condition that gas temperature is 350° C. and the space velocity is 30,000 h$^{-1}$ and then the NOx removal efficiency was obtained in a similar way as described above. The result obtained is shown in the following table 2.

TABLE 2

| Sample | Catalyst | Reducing agent | NOx removal efficiency (%) | |
|---|---|---|---|---|
| | | | Before durability test | After durability test |
| 12 | Catalyst 1 | Methanol | 88 | 83 |
| 13 | Catalyst 1 | Dimethyl Ether | 84 | 80 |
| 14* | Catalyst C2 | Methanol | 46 | 41 |
| 15* | Catalyst C3 | Methanol | 32 | 30 |
| 16* | Catalyst C4 | Methanol | 66 | 54 |
| 17* | Catalyst C3 | Dimethyl Ether | 35 | 32 |

(NOTICE) samples * on this table are comparative examples.

As is clear from the result, even in the 20-hour endurance test by the exhaust gas containing $SO_2$ of high concentration, the catalyst which is made of the proton type β zeolite catalyst according to the present invention keeps a high activity and has an excellent durability. Meanwhile, it is understandable that, as for the catalysts of comparative examples, proton type mordenite catalyst C2 and proton type ZSM-5 catalyst C3 having low denitration performance show favorable durability, but Catalyst C4 having comparatively excellent denitration performance, which is made of β zeolite which supports Co is inferior in durability.

The invention claimed is:

1. A catalyst for purifying exhaust gas, which reduces nitrogen oxides in an exhaust gas containing excessive oxygen under the existence of methanol and/or dimethyl ether, wherein the catalyst consists of a proton type β zeolite having a $SiO_2/Al_2O_3$ molar ratio within 20-70 wherein the catalyst has substantial denitrification performance and durability.

2. A method of purifying exhaust gas, wherein said method includes reducing nitrogen oxides in the exhaust gas containing excessive oxygen therein, comprising contacting the exhaust gas with a catalyst consisting of a proton type β zeolite catalyst in the presence of methanol and/or dimethyl ether as reducing agent, wherein the proton type β zeolite has a $SiO_2/Al_2O_3$ molar ratio within 20-70 wherein the catalyst has substantial denitrification performance and durability.

3. A method of purifying exhaust gas, wherein said method reduces nitrogen oxides in the exhaust gas containing excessive oxygen therein, comprising contacting the exhaust gas with a catalyst in the presence of methanol and/or dimethyl ether as reducing agent, wherein the catalyst comprises a proton type β zeolite catalyst having a $SiO_2/Al_2O_3$ molar ratio within 20-70 wherein the catalyst has substantial denitrification performance and durability.

* * * * *